US009489687B2

(12) United States Patent
Pedersen

(10) Patent No.: US 9,489,687 B2
(45) Date of Patent: Nov. 8, 2016

(54) METHODS AND SYSTEMS FOR MANAGING SOFTWARE DEVELOPMENT

(75) Inventor: Palle M. Pedersen, Brookline, MA (US)

(73) Assignee: BLACK DUCK SOFTWARE, INC., Waltham, MA (US)

(*) Notice: Subject to any disclaimer, the term of this patent is extended or adjusted under 35 U.S.C. 154(b) by 1739 days.

(21) Appl. No.: 11/961,975

(22) Filed: Dec. 20, 2007

(65) Prior Publication Data

US 2008/0154965 A1 Jun. 26, 2008

Related U.S. Application Data

(63) Continuation-in-part of application No. 11/326,806, filed on Jan. 6, 2006, now abandoned, which is a continuation-in-part of application No. 10/728,174, filed on Dec. 4, 2003, now Pat. No. 7,552,093, and a continuation-in-part of application No. 10/728,173, filed on Dec. 4, 2003, now Pat. No. 8,700,533.

(51) Int. Cl.
*G06Q 30/06* (2012.01)
*G06F 21/10* (2013.01)
*G06F 9/44* (2006.01)

(52) U.S. Cl.
CPC .............. *G06Q 30/06* (2013.01); *G06F 8/36* (2013.01); *G06F 21/10* (2013.01); *G06F 21/105* (2013.01); *G06Q 2220/18* (2013.01)

(58) Field of Classification Search
CPC .. G06Q 30/06; G06Q 2220/18; G06F 21/10; G06F 21/105
See application file for complete search history.

(56) References Cited

U.S. PATENT DOCUMENTS

| | | |
|---|---|---|
| 5,313,616 A | 5/1994 | Cline et al. |
| 5,343,527 A | 8/1994 | Moore |
| 5,469,354 A | 11/1995 | Hatakeyama et al. |
| 5,577,249 A | 11/1996 | Califano |
| 5,765,152 A | 6/1998 | Erickson |
| 5,774,883 A | 6/1998 | Andersen et al. |
| 5,796,830 A | 8/1998 | Johnson et al. |
| 5,892,900 A | 4/1999 | Ginter et al. |
| 5,893,095 A | 4/1999 | Jain et al. |
| 5,917,912 A | 6/1999 | Ginter et al. |

(Continued)

FOREIGN PATENT DOCUMENTS

WO WO-02/27486 4/2002

OTHER PUBLICATIONS

International Search Report for PCT Application No. PCT/US2007/000272, mailed Nov. 19, 2008, 2 pages.

(Continued)

*Primary Examiner* — Asfand Sheikh
(74) *Attorney, Agent, or Firm* — Foley & Lardner LLP; John D. Lanza

(57) ABSTRACT

Methods and systems to manage software development. Embodiments of the present invention allow a programmer to specify the software packages, services, and other materials used in a particular software project. As development of the software project proceeds, the materials associated with the project are reviewed to identify the materials actually used in the project and to identify any discrepancies between what has been specified and what materials are actually used. Metadata, for example license and contractual terms and other policies relating to the specified materials and the materials actually used in the project may optionally be retrieved and analyzed to identify conflicting metadata.

36 Claims, 5 Drawing Sheets

(56) References Cited

U.S. PATENT DOCUMENTS

| | | | |
|---|---|---|---|
| 5,958,051 A | 9/1999 | Renaud et al. | |
| 6,029,002 A | 2/2000 | Afifi et al. | |
| 6,035,402 A | 3/2000 | Vaeth et al. | |
| 6,072,493 A | 6/2000 | Driskell et al. | |
| 6,148,401 A | 11/2000 | Devanbu et al. | |
| 6,188,995 B1 | 2/2001 | Garst et al. | |
| 6,189,146 B1 | 2/2001 | Misra et al. | |
| 6,219,652 B1 | 4/2001 | Carter et al. | |
| 6,226,618 B1 | 5/2001 | Downs et al. | |
| 6,240,409 B1 | 5/2001 | Aiken | |
| 6,249,769 B1 | 6/2001 | Ruffin et al. | |
| 6,260,141 B1 | 7/2001 | Park et al. | |
| 6,263,348 B1 | 7/2001 | Kathrow et al. | |
| 6,275,223 B1 | 8/2001 | Hughes et al. | |
| 6,282,698 B1 | 8/2001 | Baker et al. | |
| 6,330,670 B1 | 12/2001 | England et al. | |
| 6,381,698 B1 | 4/2002 | Devanbu et al. | |
| 6,393,438 B1 | 5/2002 | Kathrow et al. | |
| 6,397,205 B1 | 5/2002 | Juola | |
| 6,480,834 B1 | 11/2002 | Engle et al. | |
| 6,480,959 B1 | 11/2002 | Granger et al. | |
| 6,493,709 B1 | 12/2002 | Aiken | |
| 6,499,035 B1 | 12/2002 | Sobeski | |
| 6,546,114 B1 | 4/2003 | Venkatesan et al. | |
| 6,557,105 B1 | 4/2003 | Tardo et al. | |
| 6,574,348 B1 | 6/2003 | Venkatesan et al. | |
| 6,581,044 B1 | 6/2003 | Alur | |
| 6,658,626 B1 | 12/2003 | Aiken | |
| 6,697,948 B1 | 2/2004 | Rabin et al. | |
| 6,862,696 B1 | 3/2005 | Voas et al. | |
| 6,931,532 B1 | 8/2005 | Davis et al. | |
| 6,941,459 B1 | 9/2005 | Hind et al. | |
| 6,954,738 B2 | 10/2005 | Wang et al. | |
| 6,954,747 B1 | 10/2005 | Wang et al. | |
| 6,961,849 B1 | 11/2005 | Davis et al. | |
| 6,976,170 B1 | 12/2005 | Kelly | |
| 6,978,367 B1 | 12/2005 | Hind et al. | |
| 6,981,023 B1 | 12/2005 | Hamilton et al. | |
| 6,983,371 B1 | 1/2006 | Hurtado et al. | |
| 7,197,156 B1 | 3/2007 | Levy | |
| 7,209,917 B2* | 4/2007 | Probst et al. | 707/706 |
| 7,254,587 B2 | 8/2007 | Lee et al. | |
| 7,278,130 B2* | 10/2007 | Iborra et al. | 717/101 |
| 7,305,701 B2 | 12/2007 | Brezak et al. | |
| 7,320,011 B2* | 1/2008 | Koskimies | |
| 7,350,191 B1* | 3/2008 | Kompella et al. | 717/108 |
| 7,464,367 B2* | 12/2008 | Wain et al. | 717/105 |
| 7,509,248 B2* | 3/2009 | Fernandez | G06F 9/4435 703/27 |
| 7,814,173 B2* | 10/2010 | Yamagishi et al. | 709/219 |
| 7,873,987 B2* | 1/2011 | Kitazato | G06F 21/10 380/279 |
| 2002/0065781 A1 | 5/2002 | Hillegass et al. | |
| 2002/0138441 A1 | 9/2002 | Lopatic | |
| 2002/0138477 A1 | 9/2002 | Keiser | |
| 2002/0138764 A1 | 9/2002 | Jacobs et al. | |
| 2002/0162030 A1 | 10/2002 | Brezak et al. | |
| 2002/0188608 A1 | 12/2002 | Nelson et al. | |
| 2002/0194010 A1 | 12/2002 | Bergler et al. | |
| 2003/0018891 A1 | 1/2003 | Hall et al. | |
| 2003/0056121 A1 | 3/2003 | Kimoto et al. | |
| 2003/0074163 A1 | 4/2003 | Anand et al. | |
| 2003/0079174 A1 | 4/2003 | Hooks | |
| 2003/0125975 A1 | 7/2003 | Danz et al. | |
| 2003/0126456 A1 | 7/2003 | Birzer et al. | |
| 2003/0149588 A1 | 8/2003 | Joao | |
| 2003/0159055 A1 | 8/2003 | Robbins et al. | |
| 2003/0163684 A1 | 8/2003 | Fransdonk | |
| 2003/0167236 A1 | 9/2003 | Stefik et al. | |
| 2003/0172035 A1 | 9/2003 | Cronce et al. | |
| 2003/0212639 A1 | 11/2003 | Cronce et al. | |
| 2003/0229581 A1 | 12/2003 | Green et al. | |
| 2004/0039916 A1* | 2/2004 | Aldis et al. | 713/177 |
| 2004/0068734 A1 | 4/2004 | Bond et al. | |
| 2004/0073570 A1* | 4/2004 | Janakiraman et al. | 707/104.1 |
| 2004/0073789 A1 | 4/2004 | Powers | |
| 2004/0093593 A1* | 5/2004 | Jhanwar et al. | 717/169 |
| 2004/0139340 A1 | 7/2004 | Johnson et al. | |
| 2004/0162827 A1 | 8/2004 | Nakano | |
| 2005/0015343 A1 | 1/2005 | Nagai et al. | |
| 2005/0027804 A1 | 2/2005 | Cahill et al. | |
| 2005/0039034 A1 | 2/2005 | Doyle et al. | |
| 2005/0060643 A1 | 3/2005 | Glass et al. | |
| 2005/0065930 A1 | 3/2005 | Swaminathan et al. | |
| 2005/0114840 A1 | 5/2005 | Zeidman | |
| 2005/0125358 A1 | 6/2005 | Levin et al. | |
| 2005/0125359 A1 | 6/2005 | Levin et al. | |
| 2005/0166094 A1 | 7/2005 | Blackwell et al. | |
| 2005/0216898 A1 | 9/2005 | Powell et al. | |
| 2005/0235342 A1 | 10/2005 | Ene-Pietrosanu et al. | |
| 2005/0246773 A1* | 11/2005 | Draine et al. | 726/22 |
| 2006/0005166 A1 | 1/2006 | Atkin et al. | |
| 2006/0015465 A1 | 1/2006 | Kume et al. | |
| 2006/0031364 A1 | 2/2006 | Hamilton et al. | |
| 2006/0031686 A1 | 2/2006 | Atallah et al. | |
| 2006/0041567 A1* | 2/2006 | Nilva | G06F 8/71 |
| 2006/0107070 A1 | 5/2006 | Rice et al. | |
| 2006/0122983 A1 | 6/2006 | King et al. | |
| 2006/0155975 A1 | 7/2006 | Mueller | |
| 2006/0195540 A1 | 8/2006 | Hamilton et al. | |
| 2007/0157311 A1 | 7/2007 | Meier et al. | |
| 2007/0162890 A1 | 7/2007 | Meier et al. | |
| 2007/0294610 A1 | 12/2007 | Ching | |
| 2007/0299825 A1 | 12/2007 | Rush et al. | |
| 2008/0215897 A1 | 9/2008 | Doyle et al. | |
| 2008/0304669 A1 | 12/2008 | Bugbee | |

OTHER PUBLICATIONS

Written Opinion for PCT Application No. PCT/US2007/000272, mailed Nov. 19, 2008, 5 pages.

Final Office Action issued in related U.S. Appl. No. 10/728,173, mailed Jan. 23, 2009, 11 pages.

Office Action issued in related U.S. Appl. No. 11/429,928 mailed Jan. 27, 2008, 11 pages.

Written Opinion for PCT Application No. PCT/US2007/021648, mailed Jan. 30, 2009, 5 pages.

International Search Report for PCT Application No. PCT/US2007/021648, mailed Jan. 30, 2009, 4 pages.

Notice of Allowance issued in related U.S. Appl. No. 10/728,174 dated Feb. 4, 2009, 11 pages.

"TeleKnowledge" M2 Presswire, Coventry: Jul. 1, 2002, 3 pages.

"ASAP eSMART Overview," ASAP Software, 1999-2002, pp. 1-2.

"Cleanscape lint jump page," Cleanscape Software International, [retrieved Nov. 26, 2003], Retrieved from the Internet: <http://www.cleanscape.net/products/lintonline/login.html>, 1 page.

"Code Analysis Settings," Ascension Labs, LLC, [retrieved Nov. 26, 2003]. Retrieved from the Internet: <http://www.ascensionlabs.com/pbca_CodeAnalysisSettings.htm>, 1 page.

"Creating a LIDESC_TAGS string," Librock LIDESC Software License Analyzer and Compatibility Reporter, [retrieved Nov. 26, 2003], Retrieved from the Internet: <http://www.mibsoftware.com/librock/lidesc/tags.htm>, pp. 1-9.

"GPL Compliance Toolset," Metroworks, [retrieved Nov. 26, 2003], Retrieved from the Internet: <http://www.metrowerks.com/MW/Develop/Embedded/Linux/GPLCT.htm>, pp. 1-2.

"How LIDESC Identifies Licensing of a File" [retrieved Jul. 18, 2003], Retrieved from the Internet: <http://www.mibsoftware.com/librock/lidesc/stamp.htm>, 23 pages.

"License Database 1.0," TapTopFolder, [retrieved Nov. 26, 2003], Retrieved from the Internet: <http://www.systemconsulting.co.uk/index.php?page=software/products/licensedb.html>, 1 page.

"Licensing," Open Source Initiative OSI, [retrieved Nov. 26, 2003], Retrieved from the Internet: < http://www.opensource.org/licenses/index.php>, pp. 1-2.

"LIDESC: Librock License Awareness System," Librock LIDESC Software License Analyzer and Compatibility Reporter, [retrieved Nov. 26, 2003], Retrieved from the Internet: <http://www.mibsoftware.com/librock/lidesc>, pp. 1-2.

(56) References Cited

OTHER PUBLICATIONS

"Lineo launches 'anti-FUD' campaign with license ID tool," Lineo, Inc. [retrieved Nov. 26, 2003], Retrieved from the Internet: <http://www.linuxdevices.com/news/NS6538038/187.html>, pp. 1-4.
"Lineo's GPL Compliance Tool," Linux DevCenter, Oct. 4, 2001, http://linux.oreillynet.com/pub/a/linux/2001/10/04/lineo.html>, pp. 1-4.
"Microsoft Software Inventory Analyzer," Microsoft Software Asset Management, [retrieved Nov. 26, 2003], Retrieved from the Internet: <http://www.microsoft.com/resources/sam/msia.mspx>, 1 page.
"Moss: A System for Detecting Software Plagiarism" [online]. Alex Aiken's Homepage [retrieved Nov. 4, 2005]. Retrieved from the Internet: <http://cs.berkeley.edu/~aiken/moss.html>, 2 pages.
"New utility helps prevent software license violations" NewsForge, OSDN Open Source Development Network, Inc., Apr. 24, 2002, [retrieved Nov. 26, 2003], Retrieved from the Internet: <http://www.linuxdevices.com/news/NS3340825769.html>, pp. 1-3.
"New utility helps prevent software license violations," NewsForge, OSDN Open Source Development Network, Inc., Apr. 23, 2002, [retrieved Nov. 26, 2003], Retrieved from the Internet: <http://www.newsforge.com/software/02/04/23/163211.shtml?tid=51>, pp. 1-3.
"News—Motorola picks Lineo for set-top box," ZDNet UK, Aug. 29, 2001, [retrieved Nov. 26, 2003], Retrieved from the Internet: <http://news.zdnet.co.uk/hardware/emergingtech/039020357,2093969,00.htm>, pp. 1-3.
"OSI Certification Mark and Program" Open Source Initiative OSI, [retrieved Nov. 26, 2003], Retrieved from the Internet: <http://www.opensource.org/docs/certification mark.php>, pp. 1-5.
"PB Code Analyzer," Ascension Labs, LLC, [retrieved Nov. 26, 2003], Retrieved from the Internet: <http://www.ascensionlabs.com/pbcodeanalyzer.htm>, pp. 1-5.
"Products," TapTopFolder, [retrieved Nov. 26, 2003], Retrieved from the Internet: <http://www.systemconsulting.co.uk/index.php?page=software/products.html>, 1 page.
"Query FTP Software License Database," The U.T. Houston Database of FTP Software Licenses, [retrieved Nov. 26, 2003], Retrieved from the Internet: <http://www.uth.tmc.edu/iaims/network/ftp.html>, 1 page.
"The Attribution Assurance License: Licensing," Open Source Initiative OSI, [retrieved Nov. 26, 2003], Retrieved from the Internet: <http://www.opensource.org/licenses/attribution.php>, pp. 1-3.
"The Open Source Definition," Open Source Initiative OSI, [retrieved Nov. 26, 2003], Retrieved from the Internet: <http://www.opensource.org/docs/definition.php>, pp. 1-4.
"Various Licenses and Comments about Them" GNU Project—Free Software Foundation (FSF), [retrieved Nov. 26, 2003], Retrieved from the Internet: <http://www.fsf.orgllicenses/license-list.html>, pp. 1-15.
"Write Me 4.1," TapTopFolder, [retrieved Nov. 26, 2003], Retrieved from the Internet: <http://www.systemconsulting.co.uk/index.php?page=software/products/writeme.html>, 1 page.
Arsenault et al., "Securely Available Credentials—Requirements", Network Working Group Request for Comments: 3157, Aug. 2001, [retrieved Nov. 26, 2003], Retrieved from the Internet: <http://ftp.rfc-editor.org/in-notes/rfc3157.txt>, pp. 1-19.
Clough, "Plagiarism in natural and programming languages: an overview of current tools and technologies", http://www1.compaq.com/pressrelease/0,1494,wp%7E14583__2!ob%7E29892__1__1.00.html, pp. 1-31, Jun. 2000.
Cohen, "Recursive Hashing Functions for n-Grams", ACM Transactions on Information Systems, vol. 15, No. 3, Jul. 1997, pp. 291-320.
Cole et al. "Verifying Candidate Matches in Sparse and Wildcard Matching" [online]. Montreal, Quebec, Canada, STOC 02, May 19, 2002-May 21, 2002 [retrieved Oct. 30, 2007]. Retrieved from the Internet: <www.citeseer.org>, 10 pages.
Damashek, "Gauging Similarity with n-Grams: Language-Independent Categorization of Text", Science, New Series, vol. 267, No. 5199, Feb. 10, 1995, pp. 843-848.

Eastlake et al, "US Secure Hash Algorithm 1 (SHA 1)", Network Working Group Request for Comments: 3174, Sep. 2001, [retrieved Nov. 26, 2003]. Retrieved from the Internet: <http://ftp.rfc-editor.orglin-notes/rfc3174.txt>, pp. 1-21.
Fougner, "Public Key Standards and Licenses", Network Working Group Request for Comments: 1170, Jan. 1991, [retrieved Nov. 26, 2003], Retrieved from the Internet: <http://fto.rfc-editor.org/in-notes/rfc1170.txt>, pp. 1-2.
Gomulkiewicz, "How Copyleft Uses License Rights to Succeed in the Open Source Software Revolution and the Implications for Article 2B," Houston Law Review, 36:179, 1999, retrieved from HCUL.doc on Oct. 2, 2003, pp. 179-194.
Heckel et al., "A Technique for Isolating Differences Between Files", Communications of the ACM, vol. 21, No. 4, Apr. 1978, pp. 264-268.
Huitema, "An Experiment in DNS Based IP Routing," Network Working Group Request for Comments: 1383, Dec. 1992, [retrieved Nov. 26, 2003], Retrieved from the Internet: <http://ftp.rfc-editor.org/in-notes/rfc1383.txt>, pp. 1-14.
International Search Report for related PCT Application No. PCT/US2007/011022, mailed Nov. 12, 2007, 4 pages.
Johnson, "Identifying redundancy in source code using fingerprints," IBM Centre for Advanced Studies Conference, Proceedings of the 1993 conference of the Centre for Advanced Studies on Collaborative research: software engineering—vol. 1, 1993, pp. 171-183.
Kamps et al. "Best Match Querying form DocumentCentric XML" [online]. Seventh International Workshop on the Web and Databases, Amsterdam, Netherlands, (WEBDB 2004), Jun. 17, 2004-Jun. 18, 2004 [retrieved on Oct. 30, 2007]. Retrieved from the Internet: <http://staff.science.uva.nl/{mdr/Publications/Files/webdb2004.pdf>, pp. 55-60.
Meziane et al. "A Document Management Methodology Based on Similarity Contents." Elsevier, 2003, Salford, United Kingdom, Information Sciences vol. 158 (2004), pp. 15-36.
Office Action issued in related U.S. Appl. No. 10/728,173, mailed Jan. 28, 2008, 6 pages.
Office Action issued in related U.S. Appl. No. 10/728,174, mailed Jan. 25, 2008, 10 pages.
Office Action issued in related U.S. Appl. No. 11/084,063, mailed Sep. 21, 2008, 15 pages.
Pethia et al., "Guidelines for the Secure Operation of the Internet", Network Working Group Request for Comments: 1281, Nov. 1991, [retrieved Nov. 26, 2003], Retrieved from the Internet: <http://ftp.rfc-editor.org/in-notes/rfc1281.txt>, pp. 1-10.
Prechelt et al., "Finding plagiarisms among a set of programs with JPlag", Resubmission to J. of Universal Computer Science, Nov. 28, 2001, http://www.jucs.org/.
Rescorla et al., "The Secure HyperText Transfer Protocol," Network Working Group Request for Comments: 2660, Aug. 1999, [retrieved Nov. 26, 2003], Retrieved from the Internet: <http://ftp.rfc-editor.org/in-notes/rfc2660.txt>, pp. 1-43.
Rivest, The MD5 Message-Digest Algorithm, Network Working Group Request for Comments: 1321, Apr. 1992, [retrieved Nov. 26, 2003], Retrieved from the Internet: <http://ftp.rfc-editor org/in-notes/rfc1321.txt>, pp. 1-20.
Schleimer et al., "Winnowing: Local Algorithms for Document Fingerprinting", pp. 76-85.
Self et al. "[fsl discuss] Automatic reporting of license terms," Apr. 28, 2002, [retrieved Nov. 26, 2003], Retrieved from the Internet: <http://lists.alt.org/pipermail/fsl-discuss/2002-April/000312.html>, pp. 1-3.
Self et al. "[fsl-discuss] Automatic reporting of license terms," Apr. 25, 2002, [retrieved Nov. 26, 2003], Retrieved from the Internet: <http://lists.alt.org/pipermail/fsl-discuss/2002-April/000309.html>, pp. 1-2.
Si et al., "CHECK: A Document Plagiarism Detection System", Symposium on Applied Computing, Proceedings of the 1997 ACM symposium on Applied computing, 1997, pp. 70-77.
Verco et al., "Plagiarism á la Mode: A Comparison of Automated Systems for Detecting Suspected Plagiarism", The Computer Journal, vol. 39, No. 9, 1996, pp. 741-750.

(56) References Cited

OTHER PUBLICATIONS

Whale, "Identification of Program Similarity in Large Populations", The Computer Journal, vol. 33, No. 2, 1990, pp. 140-146.
Wise et al., "YAP3: Improved Detection of Similarities in Computer Program and Other Texts", pp. 130-134.
Written Opinion for related PCT Application No. PCT/US2004/040453, mailed Jun. 4, 2006, 6 pages.
Written Opinion for related PCT Application No. PCT/US2006/008369, mailed Sep. 18, 2007, 4 pages.
Written Opinion for related PCT Application No. PCT/US2007/011022, mailed Nov. 12, 2007, 8 pages.
Examination Report for related European Application No. 06737533.7, mailed Jan. 15, 2008, 2 pages.
Office Action issued in related U.S. Appl. No. 11/580,220, mailed Feb. 24, 2009, 8 pages.
Office Action issued in related U.S. Appl. No. 11/326,806, mailed Feb. 26, 2009, 13 pages.
Menezes, Alfred J., "Handbook of Applied Crytography", copyright 1997 by CRC Press LLC, pp. 22-23.
Office Action issued in related U.S. Appl. No. 10/084,063, mailed May 1, 2008, 15 pages.
Farringdon, Jill M., *Introduction to Analysing for Authorship: A Guide to the Cusum Technique*, Retrieved from Website: <http://members.aol.com/qsums/>, Introduction link, web pages dated Oct. 13, 2004, Retrieved via The Wayback Machine: <www.archive.org>, 11 pages.
Invitation Pursuant to Article 94(3) and Rule 71(1) EPC for European Patent Application No. 06737533.7 dated Jun. 2, 2008, 2 pages.
Office Action issued in related U.S. Appl. No. 11/429,928 mailed Jun. 27, 2008, 14 pages.
Office Action issued in related U.S. Appl. No. 11/580,220, mailed Jul. 9, 2008, 9 pages.
Examination Report for related European Application No. 06737533.7, mailed Aug. 28, 2008, 6 pages.
Office Action issued in related U.S. Appl. No. 11/084,063, mailed Nov. 3, 2008 19 pages.
Notice of Allowance on U.S. Appl. No. 10/728,173 dated Oct. 30, 2013.
Office Action on U.S. Appl. No. 10/728,173 dated Jun. 6, 2012.
White et. al. "How Computers Work", Oct. 2003, Que, 7th Edition.
U.S. Appl. No. 10/728,174, filed Dec. 4, 2003.
U.S. Appl. No. 10/728,173, filed Dec. 4, 2003.
U.S. Appl. No. 14/169,949, filed Jan. 31, 2014.
U.S. Appl. No. 11/326,806, filed Jan. 6, 2006.

\* cited by examiner

| Materials included in Project Phantom |
|---|
| Libstdc++ |
| Glibc |
| cURL |
| Apache Log4Net |
| Apache mod_perl |
| Microsoft Visual FoxPro Redistributables |
| Google Maps |

FIG. 3

| Inventory for Project Phantom | Status |
|---|---|
| Libstdc++ | In project; license conflict with Microsoft Visual FoxPro Redistributables |
| Glibc | In project; license conflict with Microsoft Visual FoxPro Redistributables |
| cURL | Not in project |
| Apache Log4Net | In project |
| Apache mod_perl | In project |
| Microsoft Visual FoxPro Redistributables | In project; license conflict with Libstdc++; Glibc |
| Google Maps | Not in project |
| | |
| Additional components identified | |
| ALSA sound library | Not in inventory. |

FIG. 4

METHODS AND SYSTEMS FOR MANAGING SOFTWARE DEVELOPMENT

CROSS-REFERENCE TO RELATED APPLICATIONS

This application is a continuation-in-part of pending U.S. patent application Ser. No. 11/326,806, entitled, "Methods and Systems for Verifying Protectable Content," which was filed on Jan. 6, 2006, itself a continuation-in-part of both pending U.S. patent application Ser. No. 10/728,173, entitled "Authenticating Licenses for Legally-Protectable Content Based on License Profiles and Content Identifiers," which was filed on Dec. 4, 2003, and pending U.S. patent application Ser. No. 10/728,174, entitled "Resolving License Dependencies for Aggregations of Legally-Protectable Content," filed on Dec. 4, 2003. The present application claims the benefit of these pending applications, the entire disclosures of which are incorporated by reference as if set forth in their entirety herein.

FIELD OF THE INVENTION

The present invention relates to methods and systems for the management of software development, and in particular to methods and systems that manage the use of third-party materials and services in the software development process.

BACKGROUND OF THE INVENTION

Since the introduction of programmable computers, attempts have been made to improve the software development process using various methodological approaches (e.g., pair programming, object-oriented design, etc.) and technological aids (e.g., compilers, debuggers, etc.).

One methodology of interest is "code reuse," whereby programmers are encouraged to use existing software in the development of new software. While code reuse has been extant since the beginning of software development, with programmers reusing their own personally-developed software, it has taken on particular importance in light of the emergence of the "open source" software movement.

Over the past two decades, the open source software movement has made high-quality software, ranging from applications to libraries to entire operating systems, available in source code form to third party developers. Through code reuse, programmers can utilize this open source software to reduce the time and resources needed to develop new software. These programmers can, in turn, provide this new software as open source software, facilitating further development and improvement by other programmers.

Like commercial software, open source software is distributed and used subject to the terms of a software license, which is typically a contract between the licensor and the licensee of the software governing the licensee's use of the software. Unlike commercial software licenses, however, the terms of an open source software license typically allow the licensee to reuse, redistribute, and relicense the licensed source code and derivative works thereof. Some open source software licenses also contain prohibitions against the imposition of additional license terms that conflict with the terms of the open source license.

When one or more software packages licensed under different terms are used together to develop new software, it is possible that the terms of the licenses governing the combination of the packages may conflict, preventing the programmer from distributing the new software in compliance with all of the applicable software licenses. These problems may arise whether the software packages are open source software or proprietary software packages.

Programmers can attempt to identify and avoid these license conflicts with their personal knowledge of the software that they are using. However, in sizeable software projects, it may not be possible for any one programmer to know all of the software packages used in a particular project and all of the associated license terms. Moreover, if any one programmer incorporates additional software, either intentionally or by accident, without advising the developers managing the product, the result may be a license conflict that is not identified until the new software has already been shipped.

Similar issues arise with web services and other sources of information that can be incorporated into a software project in the same fashion as a software component. For example, software projects using information feeds from Google Earth or real-time stock price data from Yahoo! Finance must also comply with the contractual terms associated with the use of those services and their information, and avoid any conflicts between those contractual terms and any other contractual terms or license terms associated with the software project.

Accordingly, there is a need for methods and systems for managing software development that address the shortcomings of the prior art, track materials, services and software packages used in software development, and identify potential license, contractual, and other conflicts resulting from such use.

SUMMARY OF THE INVENTION

The present invention relates to methods and systems to manage software development. Embodiments of the present invention allow a programmer to specify the materials, including software packages, services, and other materials, used in a particular software project. As development of the software project proceeds, the materials associated with the project are reviewed to identify the software packages, services, and other materials actually used in the project and to identify any discrepancies between what has been specified and what is actually used. Metadata, for example license and contractual terms relating to the specified materials and the materials actually used in the project, may optionally be retrieved and analyzed to identify conflicting obligations specified by the metadata.

In one aspect, embodiments of the present invention provide a method for managing software development. A specification of materials, e.g., software code, services, and other materials, to be included in a software product is received, thereby generating an inventory of materials included in the software product. A specification of metadata, e.g., licensing terms, contractual terms, specified policies, and other metadata, for at least one of the materials in the inventory is also received. The use of the specified materials in the inventory in the software product is then verified. Additional metadata governing at least some of the specified materials in the inventory is received intermittently.

In one embodiment, the method includes verifying the compatibility of the metadata for each of the materials. In another embodiment, the method includes receiving approval of the materials specified in the inventory and, optionally, storing information regarding the approval of the materials in the inventory. In still another embodiment, the method includes receiving a restriction on the use of materials in the inventory and, optionally, verifying that restriction has not been violated.

In still another embodiment, the method includes storing metadata about at least one of the materials, the metadata including at least one of a web site for such materials, a version of such materials, information regarding the use of such materials, security vulnerability information, patch availability, patent information, support information, or coding standards.

Verification of the materials used in the product may include examining the source code of the software product, and may further include comparing the source code for the software product to a library of software components. Comparing the source code to a library may include comparing data derived from the source code of the software product to a library of data derived from the source code of a plurality of software components. In one embodiment, the method includes verifying the version of each of the materials in the inventory.

If one or more of the materials specified in the inventory are missing from the software product, an indication may be provided. Similarly, an indication may be provided if one or more of the materials specified in the inventory have been modified. Embodiments of the present invention may also identify materials in the software product that have not been specified in the inventory and optionally provide an appropriate indication.

In one embodiment, the method further includes receiving a notification concerning at least one of the materials specified in the inventory and providing an indication concerning the received notification. Typical notifications include one or more of the availability of a newer version of at least one of the materials specified in the inventory, a security vulnerability in at least one of the materials specified in the inventory, or a notification of pending litigation affecting at least one of the materials specified in the inventory.

In another aspect, embodiments of the present invention provide a system for managing software development. The system includes a specification module for specifying materials, e.g., software code, services, and other materials, to be included in a software product and generating an inventory of materials included in the software product. The system also includes a licensing module for specifying metadata, e.g., licensing terms, contractual terms, and specified policies, for at least one of the materials in the inventory, a verification module for verifying that the materials used in the software product match the specified materials in the inventory, and a receiver for intermittently receiving additional metadata governing at least some of the specified materials in the inventory.

In one embodiment, the verification module verifies the compatibility of the metadata for each of the materials. In another embodiment, the system also includes an interface for receiving approval of the materials in the inventory and, optionally, a memory for storing information regarding the approval of the materials in the inventory. In still another embodiment, the system also includes an interface for receiving a restriction on the use of materials in the inventory; the verification module may then verify that restriction has not been violated.

Optionally, the system may include a memory for storing metadata concerning at least one of the materials, such as information concerning a web site associated with the materials, the version of the materials, information regarding the use of the materials, security vulnerability information for the materials, the availability of patches for the materials, patent information, support information, or coding standards.

In one embodiment, the verification module verifies the materials used in the product by examining the source code of the software product. In another embodiment, the verification module verifies the materials used in the product by comparing the source code for the software product to a library of software components. In still another embodiment, the verification module compares the source to a library by comparing data derived from the source code of the software product to a library of data derived from the source code of a plurality of software components.

In one embodiment, the system includes an interface for providing an indication that at least one of the materials specified in the inventory is missing from the software product. Similarly, in another embodiment the system includes an interface for providing an indicator that at least one of the materials specified in the inventory has been modified. In still another embodiment, the verification module verifies the version of each of the materials in the inventory. In other embodiments of the present invention, the verification module identifies materials in the software product that have not been specified in the inventory.

In yet another embodiment, the system further includes a receiver for receiving a notification concerning at least one of the materials specified in the inventory and an interface for providing an indication concerning the received notification. Typical notifications include one or more of the availability of a newer version of at least one of the materials specified in the inventory, a security vulnerability in at least one of the materials specified in the inventory, or notification of pending litigation affecting at least one of the materials specified in the inventory.

The foregoing and other features and advantages of the present invention will be made more apparent from the description, drawings, and claims that follow.

BRIEF DESCRIPTION OF DRAWINGS

The advantages of the invention may be better understood by referring to the following drawings taken in conjunction with the accompanying description in which:

FIG. 3 presents an example of a materials inventory utilized by embodiments of the present invention;

FIG. 4 presents an example of an indication issued by an embodiment of the present invention in the course of managing the development of a software product.

In the drawings, like reference characters generally refer to corresponding parts throughout the different views. The drawings are not necessarily to scale, emphasis instead being placed on the principles and concepts of the invention.

DETAILED DESCRIPTION OF THE INVENTION

Figure 1:
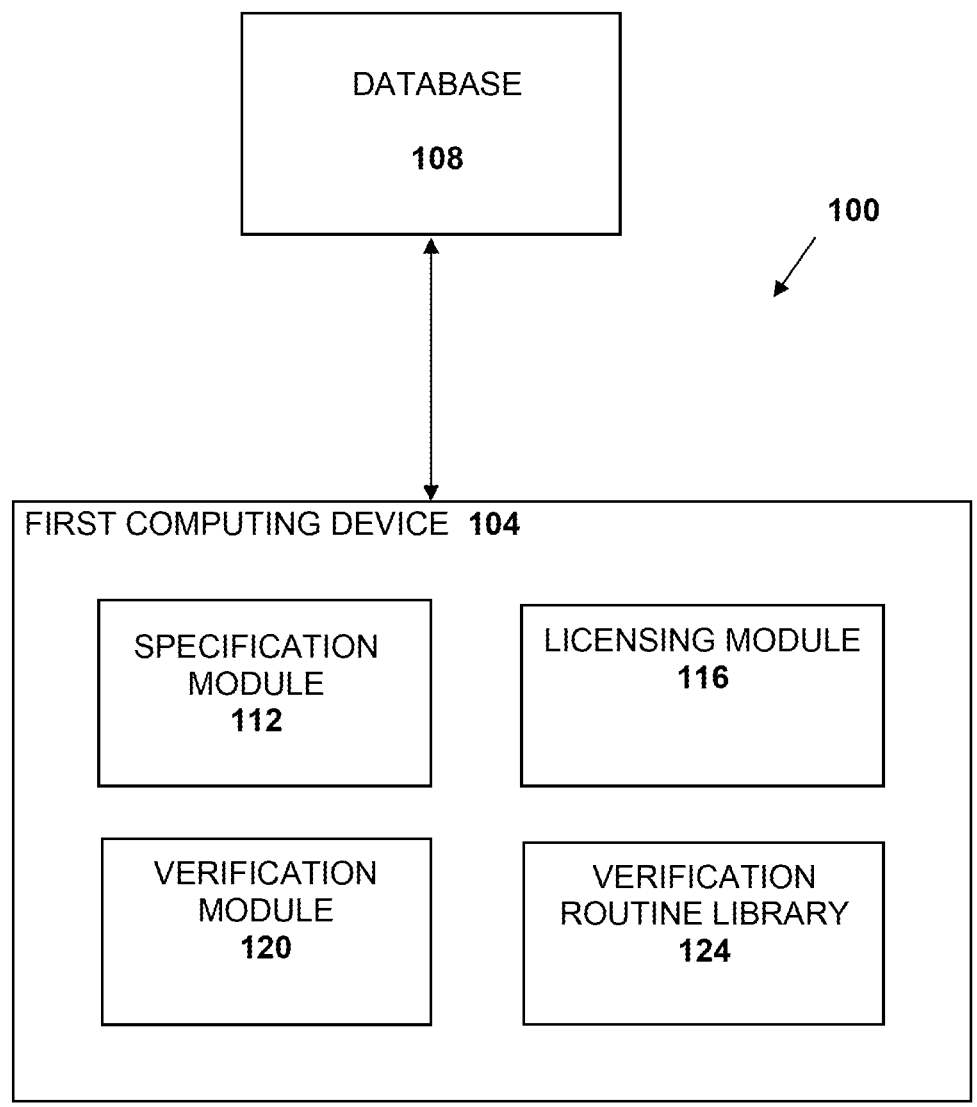
FIG. 1 is a block diagram of an illustrative embodiment of a system for managing software development.

In general, in one aspect the present invention relates to methods and systems for managing software development. In broad overview, in accordance with this aspect of the invention, a specification of materials, including software components, services. and other materials to be included in a software product is received, thereby generating an inventory of materials included in the software product. A specification of metadata, for example licensing or contractual terms, for at least one of the materials in the inventory is received. The inventory is verified by determining if the materials specified in the inventory are included in the software product.

Verification may be conducted by examining the source or object code for the software products, examining metadata related to the services, or by examining other data related to or derived from the materials. For example, source code for a software product may be compared to a library of software components. In one non-limiting example, data derived from the source code of the software product is compared to a library of data derived from the source code of a plurality of software components. After the verification has been completed, indications can be provided when it is determined that a software component specified in the inventory is missing or that a software component specified in the inventory has been modified. In another example, object code for a software product may be compared against a library of object code or otherwise reviewed to identify information useful for identifying the object code. In still another example, metadata associated with a service (e.g., a URL or XML data) is compared against a library of service metadata to identify the service.

Together with the presence of the materials specified in the inventory, the compatibility of the metadata, e.g., specified licensing or contractual terms, for each of the specified materials may also be verified. The version of each of the materials in the inventory can also be verified. A restriction on the use of a particular component, service, or other material in the inventory may be received and, furthermore, the restriction may be verified to determine that it has not been violated. Still other embodiments of the invention allow for the arbitrary specification of policies that may themselves be confirmed in the course of operation, e.g., by comparing metadata associated with the materials against metadata derived from the specified policies.

While embodiments of the present invention operate to verify the presence of materials specified in the inventory, they also operate to identify materials utilized in the software product that are not specified in the inventory. With this mode of operation, embodiments of the present invention allow for the detection of unauthorized or unknown materials introduced into the software product. Accordingly, software components, services, or other materials that are utilized in the software product but are not specified in the inventory may also be detected. In operation, these materials may be identified using the same techniques that are used to identify and verify materials specified in the inventory. In this case, these techniques identify the presence of the materials in the software product and note their absence from the list of materials specified in the inventory.

Information about at least one of the materials may be stored in a memory, for example, information concerning a web site associated with the materials, a version number, use information, security vulnerability information, patch availability, patent information, support information, or relevant coding standards.

In one non-limiting example, embodiments of the present invention are implemented as part of a business process or a workflow, allowing for approval of the materials in the inventory. Information regarding the approval of the materials in the inventory may also be stored in a memory. In another non-limiting example, a notification may be received concerning materials specified in the inventory and an indication concerning the received notification may be provided. Typical notifications include the availability of a newer version of materials specified in the inventory, a security vulnerability in materials specified in the inventory, or pending litigation affecting materials specified in the inventory.

FIG. 1 depicts a system 100 for managing software development in accord with one embodiment of the present invention. The system 100 includes a first computing device 104 in communication with a database 108. The database 108 may be on the same, or as shown, a separate device from, but local to, the first computing device 104. In such a case, the first computing device 104 and the database 108 communicate directly without the use of a network. Alternatively, in another embodiment (not shown), the database 108 is remote from the first computing device 104 and the two communicate over a network. In such a case, the network may be, for example, a local-area network (LAN), such as a company Intranet, or a wide area network (WAN), such as the Internet or the World Wide Web. The first computing device 104 may be connected to the network through a variety of connections including, but not limited to, standard telephone lines, LAN or WAN links (e.g., T1, T3, 56 kb, X.25), broadband connections (e.g., ISDN, Frame Relay, ATM), or wireless connections. The connections, moreover, may be established using a variety of communication protocols (e.g., HTTP, TCP/IP, IPX, SPX, NetBIOS, Ethernet, RS-232, and direct asynchronous connections). In yet another embodiment (not shown), the functionality of the database 108 is included on the first computing device 104.

The first computing device 104 may be any personal computer, Windows-based terminal, Network Computer, wireless device, information appliance, RISC Power PC, X-device, workstation, minicomputer, mainframe computer, personal digital assistant, set-top box, handheld device, mobile telephone, or other computing device that is capable of both presenting information/data and receiving commands.

For its part, the database 108 may be any logic and/or computing device that is capable of storing and managing collections of data, and of delivering information/data to, and receiving commands from, the first computing device 104. The database 108 may communicate using SQL or another language, or may use other techniques to store and receive data.

In one embodiment, the first computing device 104 includes a specification module 112 for the specification of materials, i.e., software components, services and other materials, to be included in a software product and the generation of an inventory of the materials included in the software product. The first computing device 104 also includes a licensing module 116 for determining metadata, for example licensing or contractual terms, for at least one of the materials in the inventory and a verification module 120 for verifying that the materials specified in the inventory are included in the software product. In operation, the verification module 120 may also identify materials actually used in the software product that are not specified in the inventory. The licensing module may also allow for the arbitrary specification of policies that may be implemented by comparing metadata associated with the materials with metadata derived from the policy. Each of the modules 112-20 may be implemented as a software, hardware, or a combination thereof, for example as an application specific integrated circuit (ASIC) or as a field programmable gate array (FPGA), that is capable of achieving the functionality described below.

The verification module 120 may, in operation, load one or more inspection routines from an inspection routine library 124 to inspect the materials, i.e., the software, services, and other components, actually used in the software product under development. In another embodiment, the verification module 120 is implemented as a standalone software program that contains its own inspection routines and the inspection routine library 124 is not used. In still another embodiment, where the verification module 120 is implemented as a hardware device, the inspection routine library 124 is either not used or is implemented in hardware or software for use in connection with the verification module 120.

Any of the specification module 112, the licensing module 116, and the verification module 120 may be combined into a single module, such that the functions performed by the modules 112-20, as described below, are in fact performed by the single module. In addition, it should be understood that any single one of the modules 112-20 may be implemented as multiple modules, such that the functions performed by any single one of the modules 112-20, as described below, are in fact performed by the multiple modules.

Figure 2:
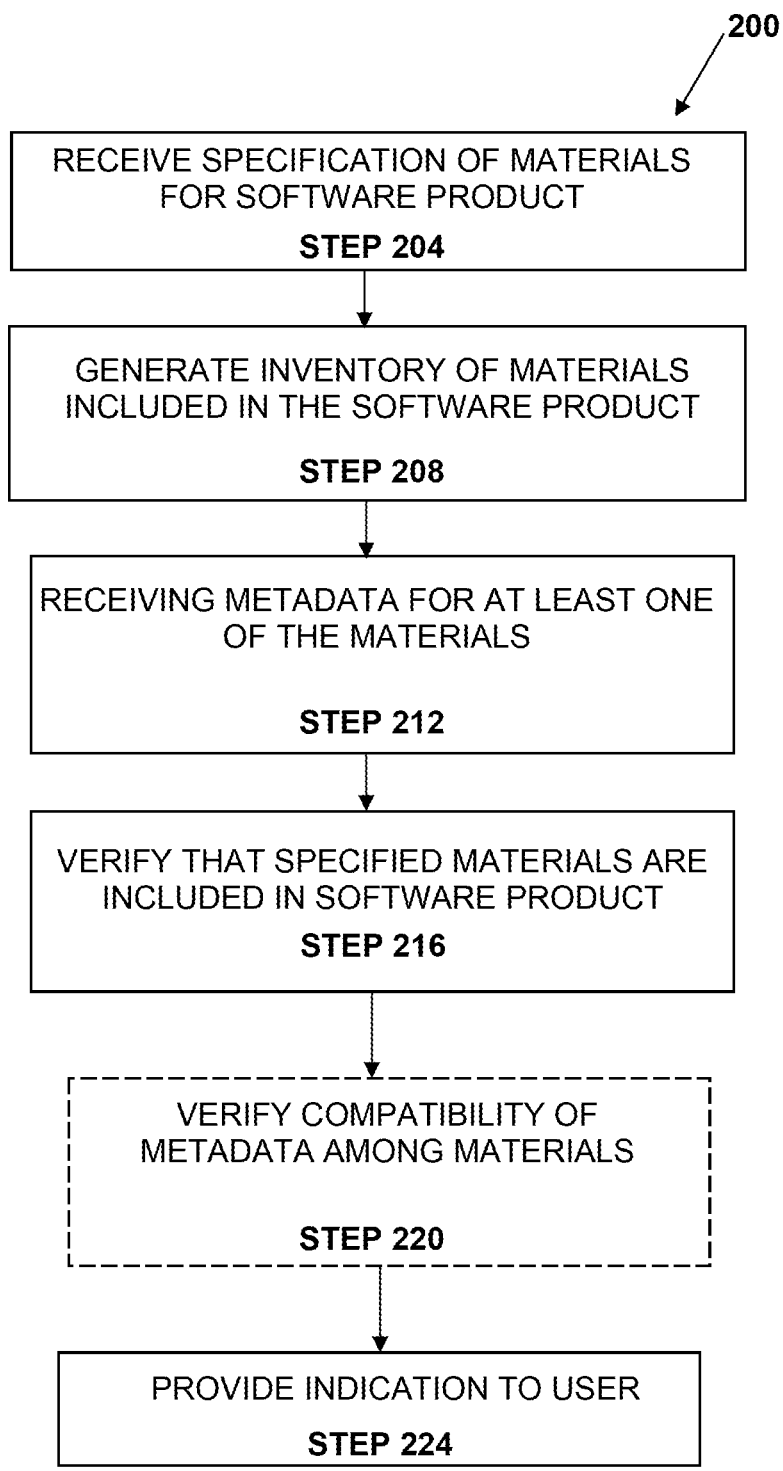
FIG. 2 is a flowchart of an illustrative embodiment of a method for managing software development.

Referring now to FIG. 2, in one embodiment of a method 200 for managing software development, for example, using the system 100 of FIG. 1, a specification of materials, i.e., software components, services, and other materials, to be included in a software product is received (Step 204). With the specification of materials, an inventory of materials included in the software product is thereby generated (Step 208). A specification of metadata, e.g., licensing or contractual terms, is received for at least one of the materials in the inventory (Step 212) and the inventory of specified materials is verified against the software product to determine whether the specified materials are included in the software product (Step 216). In addition, the method 200 may optionally include verifying the compatibility of the metadata, for example specified licensing terms, for each of the specified materials in the inventory (Step 220). In still another embodiment, the method 200 may optionally identify materials actually included in the software product that are not specified in the inventory (not shown). In yet another embodiment, the method 200 may optionally allow a user to specify a policy that may then be enforced by comparing metadata associated with the materials with metadata derived from the specified policy and identifying either violation or compliance. Typically an indication of the results of the one or more verification steps is provided to a user (Step 224).

To elaborate in greater detail, an embodiment of the present invention allows for the specification of materials to be included in a software product under development (Step 204). The specification may be made, for example, by a user operating a graphical or textual user interface, or it may be contained in a predefined file. The specification will list those materials to be included in the software product. Those materials may include open source and closed source software packages, services, and other materials used in a software product such as graphics, multimedia, text, and persistent linkages to third-party sources of information.

FIG. 3 presents an example of a specification of materials for a software product in development ("Project Phantom") utilizing a combination of closed source and open source software components and services. With the specification, an inventory of materials to be included in the software product is generated (Step 208). The inventory itself is typically in a format suited to automated processing and updating, allowing for various computer-based operations utilizing and affecting the contents of the inventory.

A specification of metadata, for example licensing or contractual terms, for at least one of the materials described in the specification or the inventory is received (Step 212). The metadata may include one or more licenses or references to license information or contractual terms that purportedly govern the use or distribution of the materials. In one embodiment, for example, licensing terms are received for every software component in the specification or the inventory. Alternatively, in another embodiment, some or all of the contractual terms received govern more than one of the services specified in the inventory.

From time-to-time, throughout the development of the software product and, possibly, after its release, the software product is reviewed to verify that the specified materials are in the product (Step 216), and optionally, that no materials are present in the software product that are not specified in an inventory. In one embodiment, where the software product is an aggregation of computer programs, computer files, or computer code, a directory of the software product is investigated to ascertain the product's software components. In other embodiments one or more of a compressed archive, an install file, a binary file, a "makefile" or an "include file" for the software product are investigated to ascertain their constituent materials, i.e., software components, services, and other materials. Investigation may include, for example, reviewing or "scanning" identified code and comparing it to previously stored code to ascertain the existence of incorporated software components. Other techniques may also be used to identify incorporated software components, services or other materials, such as those techniques described below.

Embodiments of the present invention may also operate so as to determine the compatibility of the metadata, e.g., licensing or contractual conditions, governing one or more of the specified materials or the materials actually utilized (Step 220). Embodiments of the present invention would, in a hypothetical software product under development, identify the materials specified in the inventory and the materials actually used, analyze their associated metadata, for example license and contractual conditions, and identify any incompatibilities or breaches associated with the identified metadata. For example, several proprietary software components include as a condition of their use that they not be used with "open source" software components in such a way as to subject the proprietary software to a compulsory licensing requirement. Certain open source software components have license conditions that are incompatible with the license conditions governing other open source software components.

Further embodiments allow for the arbitrary specification of any type of policy. The enforcement of these policies can be implemented by comparing metadata associated with the materials or the software product against metadata derived from the specified policy and identifying compliance with the specified policy or deviation from the specified policy.

Once the verification process is completed, an indication concerning the results of the analysis is typically provided (Step 224). FIG. 4 presents an example of an indication 400 having two parts 404, 408. The first part 404 of the indication addresses the materials that were specified and utilized in the creation of the inventory. For example, the indication in FIG. 4 indicates that one of the specified materials and one of the specified services is missing from the software product under development. Of the remaining specified materials, which are all present in the software product under development, three of the specified materials suffer from a metadata conflict, i.e., a conflict of license terms. The second part 408 of the indication indicates that additional materials have been identified in the software product under development that were not specified by a user and are not contained in the inventory associated with the software product.

The recipient of the indication may be the user that initially specified the inventory or a different user involved in the software development process. Such an indication may include further metadata about the materials in the inventory or the materials actually used, such as: the license or contractual terms, any potential conflicts with license or contractual terms or user-specified policies, and any other useful information about the materials. For example: the origin of the materials, a web site or other contact information for the author or owner of the materials, contact information for support for the materials, export restrictions, royalty or other payments required for use, known alternatives to the materials, test results, project usefulness ratings, security problems and vulnerabilities, later available versions of the materials, available modifications for the materials, and so on. Embodiments of the present invention also allow for updates of this metadata on a real-time or intermittent basis, and indications concerning updated metadata may also be provided to a user (Step 224).

Embodiments of the present invention may be integrated into a business flow such that the user receiving the indication (Step 224) retains the ability to veto or approve the addition of specified materials to the inventory (Step 204). The user may exercise their discretion either at the initial specification of the materials or post-indication, in the event that an embodiment of the present invention identifies materials that a developer has attempted to utilize in the development of the product without specifying the materials in the inventory. The user may exercise discretion in the approval of materials for legal, security, architectural, or financial reasons.

Figure 5:
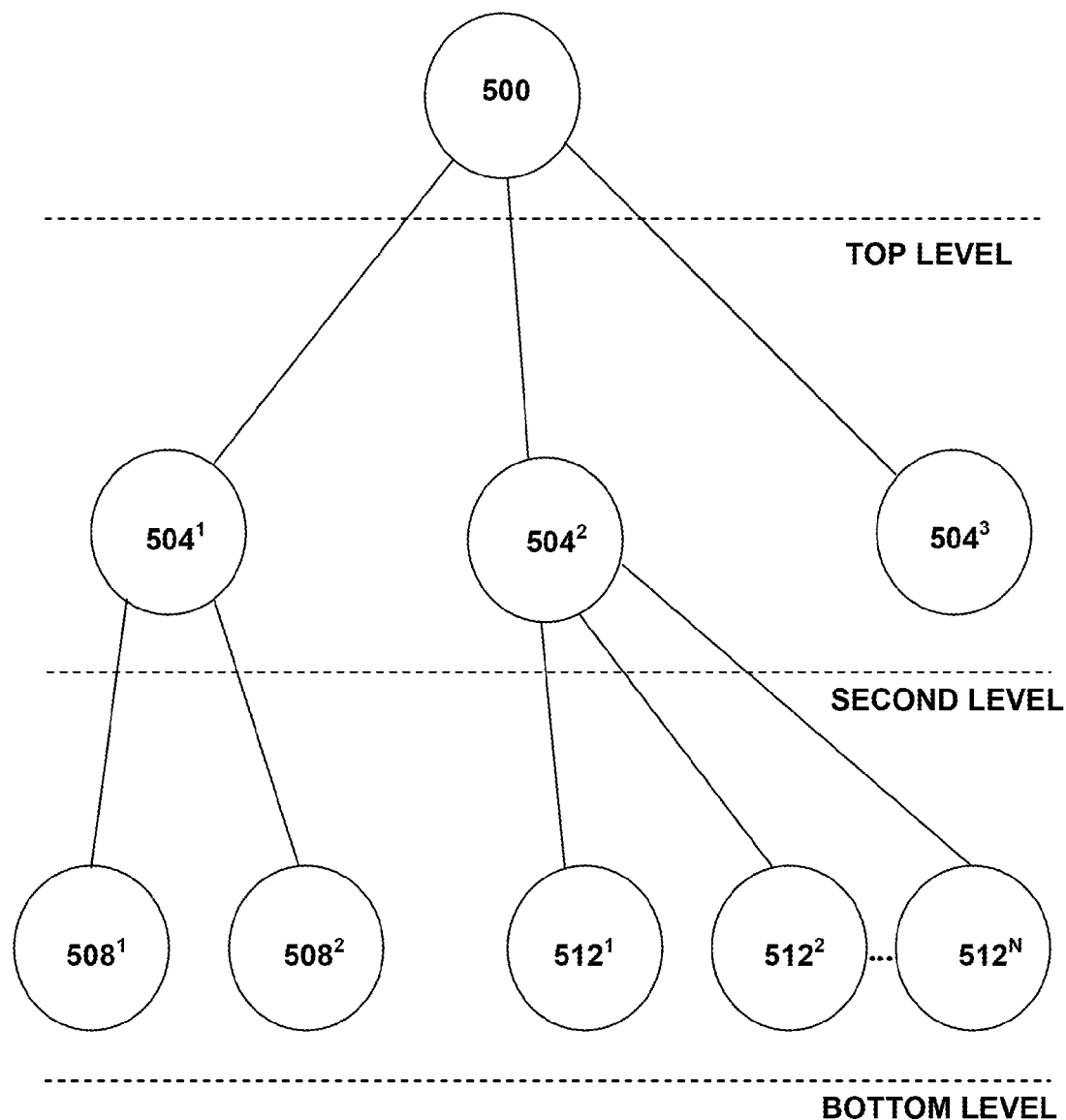
FIG. 5 presents an example of a software product decomposed hierarchically by an embodiment of the present invention in connection with the management process.

In one embodiment, the presence of individual materials is verified by decomposing the software product in a hierarchical fashion. For example, referring now to FIG. 5, when presented with a top-level software product 500, the top-level software product 500 is decomposed into its components (e.g., the three second-level component materials $504^1$, $504^2$, and $504^3$). Having decomposed the top-level software product 500 into its component materials $504^1$, $504^2$, and $504^3$, attempts are then made to decompose each second level component material $504^1$, $504^2$, and $504^3$ into its own constituent component materials. For example, second-level component material $504^1$ is decomposed into two third-level components materials $508^1$ and $508^2$, and second-level component material $504^2$ is decomposed into n third-level component materials $512^1$ to $512^n$. Attempts are made to decompose each level of component materials as described until the resulting component materials cannot be further decomposed. Referring still to FIG. 5, it may be determined, for example, that each of the second-level component material $504^3$ and the third level component materials $508^1$, $508^2$, and $512^1$ to $512^n$ do not themselves include any component materials and cannot be further decomposed.

Having decomposed the software product into its constituent component materials, the verification module 120 is used to verify the individual component materials. For example, in one embodiment, the verification module 120 starts with component material $504^1$ and its component materials $508^1$ and $508^2$. In such an embodiment, the verification module 120 verifies that each component material is present in the inventory. Indications may be provided when the component material is either present or absent from the inventory.

Verification of the presence of materials in the inventory typically includes determining, by the verification module 120, the identity of the materials at issue. Any technique that is helpful in determining the identity of the materials may be used by the verification module 120, and various techniques are described below. It should be understood, however, that the techniques described below are not mutually exclusive and can be used in various combinations and permutations, even if not expressly discussed herein, without departing from the spirit and scope of the invention. Some of these techniques may involve the use of a database, e.g., database 108; others may not.

In one embodiment, the verification module 120 inspects tokens in the component materials $508^1$, $508^2$ derived from the source code or from the object code of the component materials as appropriate. The tokens can take a variety of forms. For example, in one implementation, the verification module 120 breaks the component materials down into discrete subsets and then, for each discrete subset, evaluates a hash function to generate a hash value. The generated hash values, or a subset thereof, may then be transmitted to the database 108. The database 108 compares the hash values received from the first computing device 104 against a collection of known hash values for discrete subsets of materials. When the comparison yields a match, the database 108 notifies the first computing device 104 of the identity of the component materials $508^1$, $508^2$.

In another exemplary implementation using tokens, the verification module 120 generates a token for each word, or symbol, in the materials. Each word or symbol has an assigned token. The materials are thus translated to tokens, which tokens are then compared, for example individually, summarily (i.e., some but not all), or in proximate groups, to determine the identity of the component materials $508^1$, $508^2$.

In another exemplary implementation, the verification module 120 generates a token for each item in the materials, in a manner similar to tokens generated by a compiler. For example, each token may include a pair of integers, where the first integer is the class of token representing a code element (e.g., START, END, FUNCTION CALL, SYMBOL, CONSTANT, LITERAL, OPERATION, etc.) and the second integer identifies the member of the class (e.g., for class OPERATION, members can include without limitation ADD, SUBTRACT, COMPARE; and for class SYMBOL, the token member might be the string name of the symbol, or an identifier assigned to the string name). The tokens that are generated may then be compared to tokens stored in the database 108, for example individually or in adjacent or nearby token groups, to determine the identity of the component materials $508^1$, $508^2$. In some embodiments, for some symbol classes, only the token class types are compared. For example, for CONSTANTS and LITERALS, it may be enough to know that a CONSTANT occupied a location between an OPERATION/ADD token and an OPERATION/MULTIPLY token. The combination of some token members, in proximity to some token classes, for example, may be indicative of the identity of the component materials $508^1$, $508^2$. Use of this technique enables the verification module 120 to identify code that is functionally equivalent, but has been subject to non-functional, textual changes such as a global search and replace of variable names.

As another example, for Java code materials, the code may be compiled into bytecode tokens, and the compiled bytecode tokens compared. Although the compiled output may be compiler specific, if the same Java compiler is used to generate the tokens that are used for comparison, any anomalies due to compiler differences can be minimized. As in the example above, if desired, steps can be taken to minimize the impact of any non-functional, textual differences, such that the comparison focuses on functional similarity as represented in a group of adjacent or nearby tokens.

In one embodiment, the verification module 120 inspects the structure of the component materials $508^1$, $508^2$. For example, where the materials $508^1$, $508^2$ are source code files or object code files, the verification module 120 may inspect the code, or subsets thereof, and generate representations of how the code is structured (e.g., representations of what certain routines, sub-routines, functions, loops, etc. use as parameters, variables, constants, etc.). The generated representations may then be transmitted to the database 108 for comparison against a collection of known source code or object code structure representations. When the comparison yields a match, the database 108 notifies the first computing device 104 of the identity of the materials $508^1$, $508^2$.

In another embodiment, the verification module 120 inspects the flow of execution of the materials $508^1$, $508^2$. For example, where the component materials $508^1$, $508^2$ are source code files or object code files, the verification module 120 may inspect the code, or subsets thereof, and generate representations of the order in which discrete sections of the code (e.g., routines, sub-routines, functions, loops, etc.) are found and/or will be executed. The generated representations may then be transmitted to the database 108 for comparison against a collection of known source code or object code flow of execution representations. When the comparison yields a match, the database 108 notifies the first computing device 104 of the identity of the materials $508^1$, $508^2$.

In still another embodiment, the verification module 120 inspects copyright notices in the materials $508^1$, $508^2$. For example, where the materials $508^1$, $508^2$ are source code files or object code files, the verification module 120 may inspect the files and reproduce all copyright notices identified therein. The verification module 120 may identify such copyright notices by, for example, searching the files in a non-case-sensitive manner for the text string "copyright," searching the files in a non-case-sensitive manner for the text string "all rights reserved," searching the files in a non-case-sensitive manner for the text string "(c)," or searching the files for the symbol "©." The reproduced copyright notices may then be transmitted to the database 108 for comparison against a collection of known copyright notices. When the comparison yields a match, the database 108 notifies the first computing device 104 of the identity of the materials $508^1$, $508^2$. In some instances, however, the verification module 120 may be able to determine the identity of the materials $508^1$, $508^2$ from the copyright notices identified therein and, as such, need not involve the database 108.

In another embodiment, rather than being configured to search the materials for all instances of a copyright notice, the verification module 120 may be configured to search the materials for specific copyright notices. In such an embodiment, the database 108 need not be involved. For example, the verification module 120 may simply wish to confirm the identity of specific materials $508^1$, $508^2$ without involving the database 108. If, for example, the verification module 120 suspects, from a review of the licenses or other information that it received together with the materials, that the materials $508^1$, $508^2$ are, e.g., software code belonging to XYZ Corporation, the verification module 120 may search the source code or object code of the materials $508^1$, $508^2$ for non-case-sensitive text strings such as "XYZ Corporation," "Copyright ** by XYZ Corporation," or "©** by XYZ Corporation." In such a case, if the verification module 120 finds a match for one or more of those text strings in the materials $508^1$, $508^2$, it may confirm that the materials $508^1$, $508^2$ is the XYZ Corporation's software code. In one embodiment, to confirm such a match, the verification module 120 requires another corroborating match be made using another technique.

In another embodiment, the verification module 120 may inspect license information, which may be incomplete, in the materials $508^1$, $508^2$. For example, where the materials $508^1$, $508^2$ are source code files or object code files, the verification module 120 may inspect the file to identify all instances where license information appears. The verification module 120 may then reproduce certain license information from the identified instances, such as, for example, identifications of the licenses themselves and/or the types of the licenses, the scopes of the licenses, the durations of the licenses, the payments to be made under the licenses, or combinations thereof. The reproduced license information may, for example, be transmitted to the database 108 for comparison against a collection of known license information. When the comparison yields a match, the database 108 notifies the first computing device 104 of the identity of the materials $508^1$, $508^2$. In some instances, however, the verification module 120 may be able to determine the identity of the materials $508^1$, $508^2$ from the identified license information and, as such, need not involve the database 108.

In one embodiment, the verification module 120 may inspect license text, which may be incomplete, in the materials $508^1$, $508^2$. For example, where the materials $508^1$, $508^2$ are source code files or object code files, the verification module 120 may inspect the files to identify all instances where license text appears. The verification module 120 may then reproduce all or certain portions of the license text from the identified instances. The reproduced license text may then be transmitted to the database 108 for comparison against a collection of known license text. When the comparison yields a match, the database 108 notifies the first computing device 104 of the identity of the materials $508^1$, $508^2$. In some instances, however, the verification module 120 may be able to determine the identity of the materials $508^1$, $508^2$ from the identified license text and, as such, need not involve the database 108.

In one embodiment, rather than being configured to search the materials for all instances of license information or license text, the verification module 120 may be configured to search the materials for specific license information or license text. In such an embodiment, the database 108 need not be involved. For example, the verification module 120 may simply wish to confirm the identity of specific materials $508^1$, $508^2$ without involving the database 108. If, for example, the verification module 120 suspects, from a review of the license(s) and/or other information that it received together with the materials, that the materials $508^1$, $508^2$ are the XYZ Corporation's software code, the verification module 120 may search the materials $508^1$, $508^2$ for specific license information or license text found in the appropriate software license of the XYZ Corporation. In such a case, when the verification module 120 finds a match for the specific license information or license text in the materials 508$^1$, 508$^2$, it may confirm that the materials 508$^1$, 508$^2$ are the XYZ Corporation's software code. In one embodiment, to confirm such a match, the verification module 120 requires another corroborating match be made using another technique.

In still another embodiment, the verification module 120 inspects the materials 508$^1$, 508$^2$ for specific text strings. For example, where the materials 508$^1$, 508$^2$ are source code files, the verification module 120 may inspect the file to identify the presence or absence of certain text strings, such as, for example, "Microsoft," "Eclipse," "Oracle," and "fsf.org." Where the materials 508$^1$, 508$^2$ are object code files, the verification module 120 may employ a hexadecimal translator to inspect the file and identify the presence or absence of certain text strings in constants. Having identified certain specific text strings, the verification module 120 may then, for example, reproduce the text strings and transmit them to the database 108 for comparison against a collection of known text strings. When the comparison yields a match, the database 108 notifies the first computing device 104 of the identity of the materials 508$^1$, 508$^2$.

In another embodiment, the verification module 120 filters its identification of specific text strings in the materials 508$^1$, 508$^2$ and may also filter its query to the database 108. For example, where the materials 508$^1$, 508$^2$ are source code files, the verification module 120 may filter or restrict its identification of specific text strings to those which occur only in the comments or, alternatively, to those which occur only in the code. Moreover, the verification module 120 may filter or restrict its identification of specific text strings to those text strings that occur only in string constants or to those that occur only in the lowercase, and may treat all white-spaces, no matter how long, as equal. The query to the database 108 for a specific text string match may also be filtered as such.

In one embodiment, rather than inspecting the materials 508$^1$, 508$^2$ for specific text strings, the verification module 120 reproduces larger sections of text from the materials 508$^1$, 508$^2$, for example from the source code of the materials 508$^1$, 508$^2$, and transmits the reproduced sections of text to the database 108 for comparison against a collection of known text sections. When the comparison yields a match, the database 108 notifies the first computing device 104 of the identity of the materials 508$^1$, 508$^2$.

In one embodiment, where the materials 508$^1$, 508$^2$ are object code files, the verification module 120 inspects an object code file to identify its symbol tables. Having identified the object code file's symbol tables, the verification module 120 may then reproduce the symbol tables themselves, or, alternatively, only its symbols, and transmit them to the database 108 for comparison against a collection of known symbol tables or symbols. When the comparison yields a match, the database 108 notifies the first computing device 104 of the identity of the materials 508$^1$, 508$^2$.

In one embodiment, the materials 508$^1$, 508$^2$ are verified using a profile of information previously generated about the materials. The profile can include information about the materials, the operation of the materials, the licensing of the materials, and so on. The profile can include a signature on one or more materials, such that the materials 508$^1$, 508$^2$ can be verified by matching the signature in the materials. In one embodiment, the profile is a certificate that includes information about the protected content, the components of the protected content, and the licenses associated with the materials.

If the signatures do not match, for example, if there have been modifications to the materials since the time of the last signature, the materials can be verified, for example, by identifying a previous version of the materials that signatures do match, identifying the modifications, and then performing one or more of the above steps on the identified modifications, or as another example, by manually inspecting the modifications and any available information about the modifications (e.g., a change log) to determine whether the modifications affect the licensing status.

In still another embodiment, the materials 508$^1$, 508$^2$ are identified by studying the APIs exposed in the materials and comparing them against stored records of APIs associated with particular materials, and then using matches in the identified APIs to infer the identity of the materials 508$^1$, 508$^2$.

Once the verification module 120 has determined, using one or more of the techniques described above, the identity of the materials 508$^1$, 508$^2$, the verification module 120 proceeds to confirm that the materials are present on the inventory of specified materials (Step 216). An indication may be issued if the materials are either present on or absent from the inventory, or do not appear on the inventory at all.

Additionally, the verification module 120 may operate so as to confirm the compatibility of the metadata, e.g., the license or contractual terms or policies, associated with the materials present in the software product (Step 220). Most simply, compatibility can be verified through the use of profiles, as described herein, that include, for example, metadata about the materials 508$^1$, 508$^2$ such as any terms or conditions applicable to the materials 508$^1$, 508$^2$. In one embodiment, the profiles are stored in a database 108 and retrieved therefrom after the identity of the materials 508$^1$, 508$^2$ is determined. The profile may include a digital signature of the materials and may itself be digitally signed, such that the origin of the profile can be cryptographically verified.

In another embodiment, the profile includes other metadata about the materials instead of or in addition to the information discussed above. For example, the profile may include one or more of the following items: the name of the materials, an identifier for the materials, a table of contents describing the materials, the date of the creation of the profile or of its verification, the files covered by the verification, the date of the oldest file reviewed, the date of the most recent file reviewed, the scope of the verification (e.g., verification of source code files, import statements, include files, copyright notices, executable code, etc.), an identification of each of the components that are included in the verified materials, a list of the materials, a hierarchy (e.g., in XML or other format) that shows which materials are included in which other materials, an indication of relationship between the materials and any components (e.g., dynamically linked library, independent application, statically linked code, etc.), the amount of code reviewed in kilobytes, the number of files reviewed, a degree of confidence in the results, and license or contractual terms covering the materials. This information may be static or updated in a real-time or intermittent manner.

Table 1 presents a non-limiting example of a profile provided in a mark-up language. As can be seen, the example profile of Table 1 includes: the name of the materials, an identifier for the materials, the date of the earliest (i.e., first) file, the date of the most recent file, the scope of the verification that was conducted on the materials (which is shown as source code verification), and the number of files associated with the materials. The profile depicted also includes a list of components included in the materials (i.e., Example2 and Example3, which itself is said to have three components: Example4, Example5, and Example6). The profile depicted also includes a list of the ten files that are included in this component: file1.c, file2.c, etc. In some implementations of a profile, the files can be listed in the description of the materials. The files described in a profile may include any sort of files, such as source code files, object code files, libraries, and executables. Thus, the profile can include or be used to generate a "table of contents," or list of elements, for materials, describing each of the elements of the materials and their licensing and contractual terms. In one embodiment, the list of elements in the profile is hierarchical and describes which materials are part of other materials.

As mentioned, the profile may include license or contractual terms associated with materials. The profile may also include terms for each component within the materials. In the example of Table 1, a license is listed for each of the materials Example1-Example6. The license can be specified by name, as shown, or in other implementations can be specified by a numerical or other identifier. The license(s) can be specified within the materials listing, but could also be provided in a separate list, or other manner. The profile in Table 1 includes a signature on the contents of the profile. The signature can be used to verify the integrity of the profile. In some implementations, the signature would be accompanied by an identifier describing the entity that generated the signature. In some implementations, the profile also includes a signature on the materials or the components, for confirming their integrity.

TABLE 1

EXEMPLARY PROFILE

<profile>
<name> Example1 </name>
<id> 99A98CD82A22 </id>
<license>GPL<license>
<first-file-date> 01/10/1996 </first-file-date>
<last-file-date> 05/05/2004 </last-file-date>
<scope> source code < scope>
< file-count> 10 </file-count>
<component ><name> Example2 </name><id>1AF3293B0106
</id><license>Apache</license></component>
<component >
< name> Example3 </ name>  <id>6475293A1224
</id><license>GPL</license>
  <component><name> Example4 </name> <id>3174657782AC
  </id><license>GPL</license></component>
  <component> <name> Example5 </name>
  <id>7654AB54CA45 </id><license>LGPL</license></component>
  <component> <name> Example6 </name>
  <id> 8473E0F11100 </id><license><LGPL></license></component>
</component>
<files>file1.c file2.c file3.cpp. file4.h file5.prl file6.php file7.jar file8.dll file9.o file10</files>
<signature> 3F4D2D29FF318394 </signature>
</profile>

Although not shown, the profile also can include detailed information about the licenses, for example, terms and characteristics of the license.

Incident to determining the compatibility of the metadata governing the materials (Step 220), the verification module 120 may also determine the metadata governing materials 508$^1$, 508$^2$. In one embodiment, this information is determined from the licenses or other information that was received together with the materials. In another embodiment, one or more of the techniques described above is used to identify the associated metadata, including but not limited to the author or owner of the software and the applicable license terms. The profile may be generated by the author or owner of the materials or, alternately, may be developed by a third party independent of the author or owner of the materials.

In one embodiment, the verification module 120 compares the stated metadata for the materials 508$^1$, 508$^2$ against a stored profile. If the stated metadata match the stored profile, the metadata for the materials 508$^1$, 508$^2$ are verified to be valid. Otherwise, if the stated information does not match the stored profile, the metadata for the materials 508$^1$, 508$^2$ are deemed invalid, in that they do not, or do not alone, govern the use or distribution of the materials 508$^1$, 508$^2$.

Once the metadata for the first and second component materials 508$^1$, 508$^2$ have been identified and, optionally, verified, the verification module 120 proceeds to verify the compatibility of the metadata governing the specified materials. More specifically, the verification module 120 can employ an evaluation process to form profiles representing the verified metadata for the first and second component materials 508$^1$, 508$^2$, and can also employ an aggregation software process to analyze the attributes and attribute values of such profiles and thereby determine specific attribute and attribute value compatibilities or incompatibilities. Indications of the specific attribute and attribute value compatibilities or incompatibilities may then be used provided by the verification module 120 to users or additional automated processes for use in the management of software development.

For example, the verification module 120 may compare the metadata that purportedly govern the materials 508$^1$ against the metadata that purportedly govern the materials 508$^2$. If the metadata for the materials 508$^1$ are compatible with the metadata for the materials 508$^2$, the metadata for the materials 508$^1$, 508$^2$ are deemed compatible. Otherwise, if the metadata for the materials 508$^1$ are not compatible with metadata for the materials 508$^2$, then the metadata for the materials 508$^1$, 508$^2$ are deemed incompatible.

In one embodiment, the metadata that purportedly govern the materials 508$^1$ and the metadata that purportedly govern the materials 508$^2$ are each found to include the union of the most restrictive aspects of the metadata for the materials 508$^1$ and the most restrictive aspects of the verified metadata for the materials 508$^2$. In such exemplary cases, the metadata that purportedly govern the materials 508$^1$ and the metadata that purportedly govern the materials 508$^2$ are deemed compatible. It should be understood that the metadata that purportedly govern the software component 508$^1$ and the metadata that purportedly govern the software component 508$^2$ are deemed compatible in other ways.

The comparison of the metadata that purportedly govern the materials 508$^1$ and the metadata that purportedly govern the materials 508$^2$ may be performed in any number of ways. For example, in one non-limiting example, the verification module 120 employs an evaluation software process to form profiles for the metadata that purportedly govern the materials 508$^1$ and the metadata that purportedly govern the materials 508$^2$. Those profiles may then be compared to determine if they match. Other methods for comparing the metadata may be employed.

With reference again to the exemplary hierarchical structure for the software product 500 depicted in FIG. 5 and to the method 200 depicted in FIG. 2, Steps 216 or 220 may be performed for each of the materials 508, 512 to verify its presence in the inventory or its absence therefrom, and to verify the compatibility of the metadata for each of the materials. Each of steps 216 or 220 may also be performed against intermediate aggregations of materials 504 or the software product 500 itself.

In general, it should be noted that the present invention may be provided as one or more computer-readable programs embodied on or in one or more articles of manufacture. The article of manufacture may be a floppy disk, a hard disk, a CD ROM, a flash memory card, a PROM, a RAM, a ROM, or a magnetic tape. In general, the computer-readable programs may be implemented in any programming language. Some examples of languages that can be used include C, C++, or JAVA. The software programs may be stored on or in one or more articles of manufacture as object code.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A non-transitory computer readable medium storing instructions that, when executed by one or more computing processors, cause the one or more computing processors to:
    receive a specification of materials to be included in a software product thereby generating an inventory of materials included in the software product, wherein the materials included in the software product include a source code component;
    receive a specification of metadata for at least one of the materials in the inventory, the metadata comprising licensing terms governing the distribution of the at least one of the materials;
    store the licensing terms in a profile in a database;
    verify that the materials included in the software product match the specified materials in the inventory, including comparing a first set of tokens generated for the source code component to a second set of tokens stored in the database for a corresponding component in the specified materials in the inventory, wherein the first set of tokens and the second set of tokens are generated by a same code compiler;
    verify that each of the licensing terms represented in the profile, for the materials used in the software product, are either compliant with a specified license policy or are mutually compatible with the licensing terms for the other materials used in the software product;
    intermittently receive additional metadata comprising new or revised licensing terms governing the distribution of at least some of the specified materials in the inventory and update the licensing terms stored in the profile based on the received additional metadata; and
    verify that each of the licensing terms represented in the updated profile, for the materials used in the software product, are either compliant with the specified license policy or are mutually compatible with the licensing terms for the other materials used in the software product.

2. The non-transitory computer readable medium of claim 1 further storing instructions that, when executed, cause the one or more computing processors to provide a graphical user interface to receive a specification of materials to be included in the software product.

3. The non-transitory computer readable medium of claim 1 further storing instructions to verify compatibility of the distribution terms associated with each of the materials with the distribution terms associated with others of the materials.

4. The non-transitory computer readable medium of claim 1 further storing instructions to receive approval of the materials in the inventory.

5. The non-transitory computer readable medium of claim 4 further storing instructions to store information regarding the approval of the materials in the inventory.

6. The non-transitory computer readable medium of claim 1 further storing instructions to receive a restriction on the use of materials in the inventory.

7. The non-transitory computer readable medium of claim 6 further storing instructions to verify that the restriction has not been violated.

8. The non-transitory computer readable medium of claim 1 further storing instructions to store metadata about at least one of the materials, the metadata comprising at least one of a web site for such materials; a version of such materials, information regarding the use of such materials, security vulnerability information, patch availability, patent information, support information, or coding standards.

9. The non-transitory computer readable medium of claim 1, wherein the instructions to verify the materials used in the product comprise instructions to examine source code of the software product and compare the source code to a library of software components.

10. The non-transitory computer readable medium of claim 9 wherein the instructions to compare the source code to a library comprise instructions to compare data derived from the source code of the software product to a library of data derived from the source code of a plurality of software components.

11. The non-transitory computer readable medium of claim 1 further storing instructions to provide an indication that at least one of the materials specified in the inventory is missing from the software product.

12. The non-transitory computer readable medium of claim 1 further storing instructions to providing provide an indication that at least one of the materials specified in the inventory has been modified.

13. The non-transitory computer readable medium of claim 1 further storing instructions to verify the version of each of the materials in the inventory.

14. The non-transitory computer readable medium of claim 1 further storing instructions to identify materials in the software product that have not been specified in the inventory.

15. The non-transitory computer readable medium of claim 1 further storing instructions to:
    receive a notification concerning at least one of the materials specified in the inventory; and
    provide an indication concerning the received notification.

16. The non-transitory computer readable medium of claim 15 wherein the notification comprises at least one of the availability of a newer version of at least one of the materials specified in the inventory, a security vulnerability in at least one of the materials specified in the inventory, or pending litigation affecting at least one of the materials specified in the inventory.

17. The non-transitory computer readable medium of claim 1, wherein the profile is provided by an author or owner of the materials.

18. The non-transitory computer readable medium of claim 1, wherein the computer-executable instructions, when executed by the computing device, cause the computing device to search one or more of the materials included in the software product for license text or license information.

19. The non-transitory computer readable medium of claim 1, wherein the computer-executable instructions, when executed by the computing device, cause the computing device to verify that each of the licensing terms represented in the profile, for the materials used in the software product, are either compliant with the specified license policy or are mutually compatible with the licensing terms for the other materials used in the software product by evaluating the profile for attributes and attribute values indicating compatibilities or incompatibilities.

20. A system for managing software development, the system comprising:
   a non-transitory computer-readable memory storing computer-executable instructions; and
   a computing device operatively coupled to the non-transitory memory, a receiver, and an interface, wherein the computer-executable instructions, when executed by the computing device, provide:
      a specification module for specifying materials to be included in a software product and generating an inventory of materials included in the software product, wherein the materials included in the software product include a source code component;
      a licensing module identifying licensing terms governing the distribution of specifying metadata for at least one of the materials in the inventory and storing the licensing terms in a profile; and
      a verification module for
         verifying that the materials included in the software product match the specified materials in the inventory,
         comparing a first set of tokens generated for the source code component to a second set of tokens stored in the database for a corresponding component in the specified materials in the inventory, wherein the first set of tokens and the second set of tokens are generated by a same code compiler, and
         verifying that each of the licensing terms represented in the profile, for the materials used in the software product, are either compliant with a specified license policy or are mutually compatible with the licensing terms for the other materials used in the software product, and
   wherein the receiver is configured to: intermittently receive additional metadata comprising new or revised licensing terms governing the distribution of at least some of the specified materials in the inventory, update the stored profile with the received additional metadata, and notify the verification module to verify that each of the licensing terms represented in the updated profile, for the materials used in the software product, are either compliant with the specified license policy or are mutually compatible with the licensing terms for the other materials used in the software product.

21. The system of claim 20 wherein the materials are one or more of software code and services.

22. The system of claim 20 wherein the metadata identified by the licensing module includes one of contractual terms and specified policies.

23. The system of claim 20 wherein the verification module verifies the compatibility of the distribution obligations associated with each of the materials.

24. The system of claim 20 wherein the interface receives approval of the materials in the inventory.

25. The system of claim 24 wherein the memory stores information regarding the approval of the materials in the inventory.

26. The system of claim 20 wherein the interface receives a restriction on the use of materials in the inventory.

27. The system of claim 26 wherein the verification module verifies that the restriction has not been violated.

28. The system of claim 20 wherein the memory stores metadata about at least one of the materials, the metadata comprising at least one of a web site for such materials; a version of such materials, information regarding the use of such materials, security vulnerability information, patch availability, patent information, support information, or coding standards.

29. The system of claim 20, wherein the verification module verifies the materials used in the product by examining source code of the software product and comparing the source code to a library of software components.

30. The system of claim 29 wherein the verification module compares the source code to a library by comparing data derived from the source code of the software product to a library of data derived from the source code of a plurality of software components.

31. The system of claim 20 wherein the interface provides an indication that at least one of the materials specified in the inventory is missing from the software product.

32. The system of claim 20 wherein the interface provides an indication that at least one of the materials specified in the inventory has been modified.

33. The system of claim 20 wherein the verification module verifies the version of each of the materials in the inventory.

34. The system of claim 20 wherein the verification module identifies materials in the software product that have not been specified in the inventory.

35. The system of claim 20 wherein the receiver is configured to receive a notification concerning at least one of the materials specified in the inventory and the interface provides an indication concerning the received notification.

36. The system of claim 35 wherein the notification comprises at least one of the availability of a newer version of at least one of the materials specified in the inventory, a security vulnerability in at least one of the materials specified in the inventory, or pending litigation affecting at least one of the materials specified in the inventory.

* * * * *